Patented Feb. 26, 1946

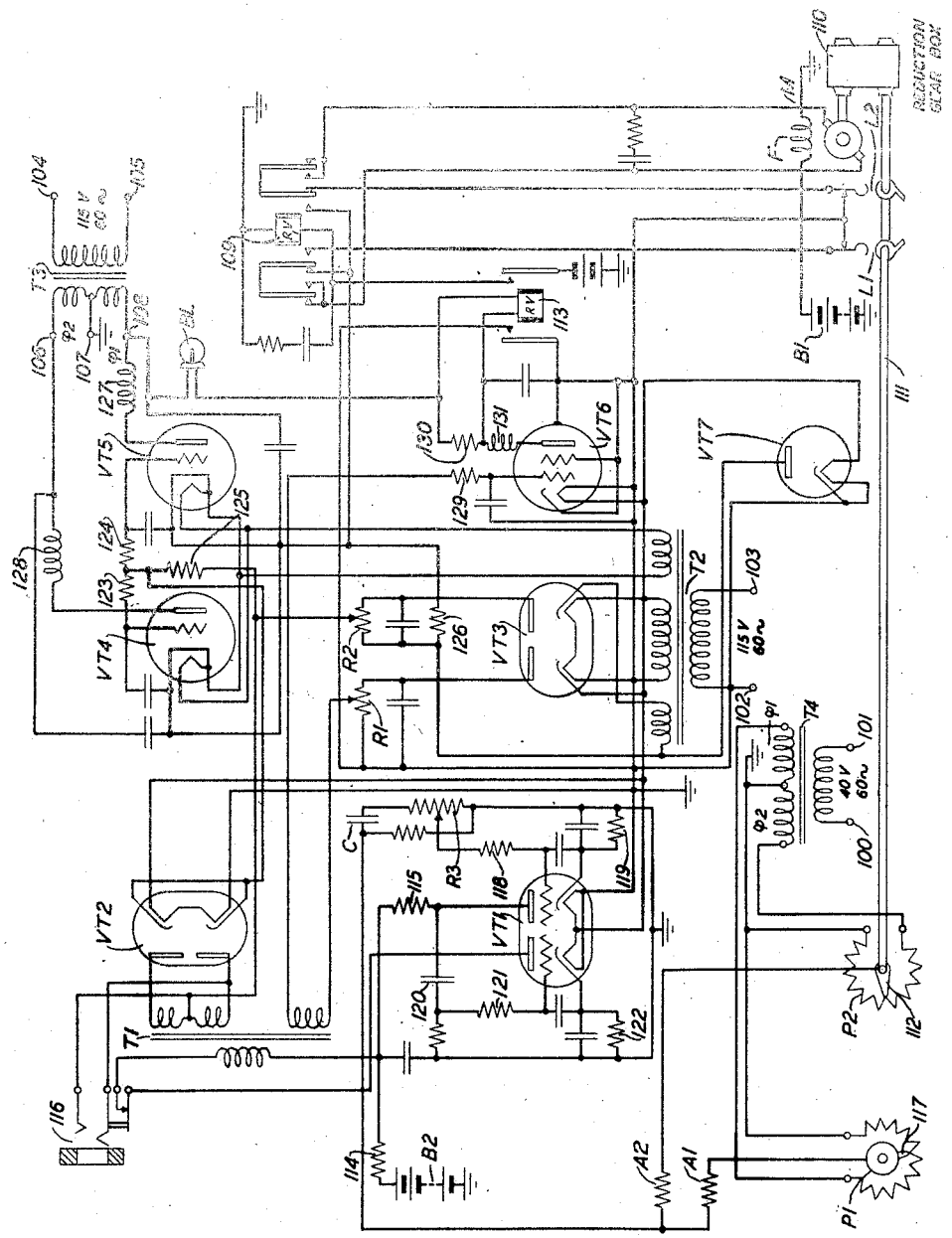
*INVENTOR*
R.H. GUMLEY
BY P.C. Smith
*ATTORNEY*

2,395,477

UNITED STATES PATENT OFFICE 2,395,477

MOTOR-CONTROL CIRCUIT

Robert H. Gumley, Whitestone, N. Y., assignor to Bell Telephone Laboratories, Incorporated, New York, N. Y., a corporation of New York Application June 30, 1944, Serial No. 542,972

4 Claims. (Cl. 172—239)

This invention relates to motor control systems and more particularly to aircraft trainers whereby in response to electrical changes imposed upon some of the circuits in response to the operation of the flight or other controls of the trainer in simulation of the operation of an aircraft, electrical changes are imposed upon other circuits of the trainer.

It is the object of the present invention to provide a control system especially adapted to aircraft trainers, although capable of general use, wherein a reversible direct current motor operable to control the operation of mechanism of the trainer is operated by alternating current potential to maintain the accurate setting of such mechanism as may be dictated by the setting of controlling elements.

Another object of the invention is to provide a control system employing electronic control devices so arranged that such control devices may not be falsely operated by inductive surges from the motor following the cessation of driving impulses transmitted through such devices to the motor, which false operation would result in the continuing operation of the motor.

The foregoing objects and others pertinent thereto are accomplished by providing a first pair of electronic devices responsive alternately to the alternate half cycles of either a negative or positive phase unbalance of a network supplied by alternating current potentials from one or more remotely located control elements, which establish the rotor circuit of a direct current motor upon alternate positive cycles of a second source of alternating current; by providing a second electronic device responsive only to the unbalance of the network in one phase which establishes the circuit of a relay upon each positive wave of the second source of current to cause a reversal of the rotor circuit of the motor, and a diode tube and series resistance in shunt of the rotor winding of the motor which serve to disconnect the rotor of the motor from the cathode grid circuits of the pair of electronic devices when inductive surges are generated by the motor at the end of each driving impulse through the rotor winding.

The novel features of the invention are set forth in the appended claims and the invention as to its organization and its mode of operation will be best understood from the following detailed description when read in connection with the single sheet of drawing.

In the drawing the motor M is provided with a stator or field winding F which is excited from the source B1 of direct current. The rotor circuit of the motor is supplied with 115 volt 60-cycle current supplied from the left divided secondary winding of transformer T3. The potentials produced between the terminals 106 and 107 and between the terminals 107 and 108 will hereinafter be referred to as first sources of alternating current of opposite phases $\phi 1$ and $\phi 2$. The rotor circuit extends over contacts of the reversing relay 109, over contacts of the limit switches L1 and L2 and over the cathode-anode paths through the gas-filled control tubes VT4 and VT5 when such tubes are in a conducting condition. The shaft of the motor M is coupled to the driving shaft of a reduction gear box 110, the driven shaft of which is coupled to the shaft 111 upon which are mounted the operating cams of the limit switches L1 and L2 and the brush 112 of the balancing potentiometer P2. The shaft 111 may also be employed to drive other apparatus as may be desired as, for example, the trimming control shaft of a trimming or loading mechanism such as is disclosed in the application of Bohman et al., Serial No. 542,984, filed concurrently herewith.

For controlling the motor M a dual amplifier tube VT1, two dual diode rectifying tubes VT2 and VT3, three gas-filled tubes VT4, VT5 and VT6, the diode rectifier tube VT7, the reversing relay 109 and the anode relay 113 are provided. The two units of the dual amplifying tube VT1 are connected in tandem and serve to receive an input signaling potential, to amplify it and through the step-up transformer T1 to apply it to the anodes of the rectifier tube VT2. The tube VT2 serves as a full wave rectifier to rectify the input potential applied to its anodes and to apply it as a positive potential to the grids of the gas-filled tubes VT4 and VT5. The output potential from the tube VT1 is also applied through the lower secondary winding of transformer T1 to the control grid of the gas-filled tube VT6. As hereinbefore stated the diode tube VT7 in series with resistance 126 is connected in shunt of the rotor winding of the motor M.

Filament heating current for all of these tubes is supplied from a source of alternating current through the windings of power transformer T2 and direct current for furnishing grid bias to the control grids of tubes VT4, VT5 and VT6 is supplied from the same alternating current source through the power transformer T2 and the dual rectifier tube VT3. Anode potential of 60 cycles is supplied to tubes VT4, VT5 and VT6 over the secondary winding of transformer T3, the anode potential supplied to tube VT4 being displaced 180 degrees in phase from the potential supplied to the anode of tube VT5. The anode of the right unit of tube VT1 is supplied with anode potential from the direct current source B2 through resistances 114 and 115 and the anode of the left unit of tube VT1 is supplied with anode potential from the source B2 through resistance 114, through the primary winding of transformer T1 and over the normal contacts of test jack 116.

The motor control circuit may be controlled from a control device, such as the potentiometer P1, over the input circuit through resistance A1, and over the balancing circuit through resistance A2 and through the balancing potentiometer P2. For example, the brush of potentiometer P1 may be controlled by a trimming wheel located beside the pilot's seat as fully disclosed in the Bohman et al. application hereinbefore referred to. The windings of potentiometers P1 and P2 are energized from the divided secondary winding of the signaling potential supply transformer T4, the potentials supplied to these potentiometer windings being displaced 180 degrees in phase. The sources of potential connected across the primary winding terminals 100 and 101 and 104 and 105 of transformers T4 and T3 are preferably of different value but phased the same.

It will be assumed that the brush 117 of potentiometer P1 is moved until the control circuit for the motor M is no longer balanced and that potential of phase φ1 supplied over the right portion of the secondary winding of transformer T4 over the left portion of the winding and brush 117 of potentiometer P1, through resistance A1, condenser C and the winding of grid biasing control rheostat R3 to ground, predominates over the potential of phase φ2 supplied over the left portion of the secondary winding of transformer T4, over the lower portion of the winding and brush 112 of balancing potentiometer P2, through resistance A2, condenser C and the winding of rheostat R3 to ground. Therefore, a potential of phase φ1 having a value equal to the difference between the control potential of phase φ1 and the balancing potential of phase φ2 is applied to rheostat R3 and a potential derived therefrom is applied over the slider of rheostat R3 and through resistance 118 to the control grid of the right unit of amplifier tube VT1.

Tube VT1, whose grid-cathode circuit is completed through resistance 119 to ground, is now effective to amplify the input signal potential and to impress it upon the input circuit of the left unit of tube VT1 over a circuit which may be traced from ground through resistance 119 over the cathode-anode path through the right unit of tube VT1 to the anode thereof, thence through condenser 120 and resistance 121 to the control grid of the left unit of tube VT1. The input circuit for the left unit of tube VT1 is completed from the cathode of such unit through resistance 122 to ground. The left unit of tube VT1 now further amplifies the input signal potential and impresses it upon the primary winding of step-up transformer T1 over a circuit which may be traced from ground through resistance 122, over the cathode-anode path through the left unit of tube VT1, over the normal contacts of jack 116, through the primary winding of transformer T1 and resistance 114 to the anode supply battery B2.

The potential applied to the primary winding of transformer T1 is impressed upon the secondary windings thereof and stepped up thereby. This stepped-up potential is then applied over the upper secondary winding of transformer T1 through the full wave rectifier tube VT2 and resistances 123 and 124 to the control grids of gas-filled tubes VT4 and VT5 where it appears as a positive potential of phase φ2.

Normal negative biasing potential is applied to the control grids of tubes VT4 and VT5 from the left secondary winding of power transformer T2 and through the right unit of rectifier tube VT3 so that the tubes VT4 and VT5 are critically biased when no signal is being received. The biasing circuit for tube VT4 may be traced from the grid thereof through resistances 123 and 125, to the slider of rheostat R2, over the anode-cathode path through the right unit of tube VT3, through the left secondary winding of transformer T2 and through resistance 126 to the cathode of tube VT4. A similar biasing circuit extends from the grid of tube VT5, through resistances 124 and 125 and thence as traced through resistance 126 to the cathode of tube VT5.

Alternating current potential of 60 cycles applied from a source connected to terminals 104 and 105 of the primary winding of transformer T3 is impressed upon the secondary winding of such transformer and, such secondary winding having its midpoint grounded, potentials 180 degrees apart in phase are derived from the two portions of the secondary winding. Potential of phase φ1 is applied from the lower portion of the secondary winding through the choke coil 127 to the anode of tube VT5 and potential of phase φ2 is applied from the upper portion of the secondary winding through the choke coil 128 to the anode of tube VT4.

Since the tube VT2 serves as a full wave rectifier, at the instant the signaling potential appears as a positive potential on the grid of tube VT4, the anode of tube VT4 will also be positive and tube VT4 will therefore fire and apply a positive impulse of current over a circuit from ground through the upper portion of the secondary winding of transformer T3 through choke coil 128, over the anode-cathode path through tube VT4, over the left back contacts of reversing relay 109, through the rotor of motor M, over the right back contacts of relay 109 and over the normal contacts of limit switch L2 to ground. During the next half cycle of the signaling potential when it again appears as a positive potential on the grid of tube VT5, the anode of tube VT5 will also be positive since the source connected to the terminals 104 and 105 is in phase with the source of signaling current and tube VT5 will fire and apply a positive impulse of current over a circuit from ground through the lower secondary winding of transformer T3, through the choke coil 127, over the anode-cathode path through tube VT5, over the left back contacts of relay 109 and thence as traced through the rotor circuit of motor M to ground. Thus tubes VT4 and VT5 alternately function on successive half waves of the signaling potential to transmit impulses of current through the rotor of motor M.

At the instant that the signal potential of phase φ2 is impressed upon the grids of tubes VT4 and VT5 potential of the same phase is impressed through the lower right winding of transformer T1 upon the grid of gas-filled tube VT6. This tube is supplied with a normal negative bias from the middle secondary winding of power transformer T2 and through the left unit of rectifier tube VT3 so that tube VT6 is critically biased when no signal is being received. The biasing circuit for tube VT6 may be traced from its grid through resistance 129, through the lower secondary winding of transformer T1 to the slider of rheostat R1, over the anode-cathode path through the left unit of tube VT3 and through the filament of tube VT6 to the cathode of such tube.

At this instant the anode of tube VT6 is supplied with negative anode potential of phase φ1 over a circuit from ground through the lower portion of the secondary winding of transformer T3, through the ballast lamp resistance BL, thence in parallel through resistance 130 and the winding of anode relay 113, through choke coil 131 to the anode of tube VT6. With positive potential of phase φ2 connected to its grid and negative potential of phase φ1 connected to its anode tube VT6 does not fire and relay 113 does not operate and consequently relay 109, which is controlled by relay 113 over an obvious circuit, is not operated. With relay 109 unoperated the rotor circuit of motor M extends as previously traced. The rotor winding is energized by impulses of current transmitted therethrough by the alternate firing of tubes VT4 and VT5 and with the stator circuit of the motor energized by current from the direct current source B1, the motor is operated in a direction to rotate the brush 112 of potentiometer P2 toward the lower terminal of its winding.

With the motor running, the counter-electromotive force generated thereby appears as a positive potential over a circuit through resistance 126 upon the anode of the diode tube VT7 the cathode of which tube is connected to ground. The poling of tube VT7 is such that current will flow under this condition through the tube so connecting the bias circuit for the tubes VT4 and VT5 to ground through the tube VT7 and thereby placing the rotor of the motor into the grid-cathode circuits of the VT4 and VT5 tubes. The counter-electromotive force of the motor will now make the cathodes of tubes VT4 and VT5 more positive with respect to their grids. When the speed of the motor increases to such an extent that the counter-electromotive force equals the incoming signal potential, the tubes cease firing and the motor coasts until the generated counter-electromotive force falls below the potential of the incoming signal. Then the tubes will again commence firing alternately until the motor again attains a speed commensurate with the potential of the incoming signal.

At the end of the last impulse when the tubes VT4 and VT5 should cease firing either due to the cessation of the signaling potential or when the signaling potential becomes reduced to a zero value through the counterbalancing effect of the counter-electromotive force, an inductive surge potential is generated in the motor opposite in polarity to the impulses which have been driving the motor which surge potential becomes applied between the grid and cathode of either tube VT4 or VT5 whereby that one of the tubes whose anode is at the time positive might falsely fire thereby transmitting another or false driving impulse through the rotor circuit of the motor. When this impulse ceases through the extinguishing of the fired tube another inductive surge potential applied from the motor may similarly falsely fire the other tube so that in this manner the motor may continue to operate even though no signaling potential is being received or the signaling potential is entirely counterbalanced by the counter-electromotive force of the motor.

The diode tube VT7, however, prevents this false firing condition since the potential which appears across the anode and cathode of the tube VT7 due to any inductive surge generated by the motor is opposite in polarity to the counter-electromotive force of the motor and therefore applies a negative potential at the anode of tube VT7 thereby keeping tube VT7 from conducting. Since the tube VT7 is not conducting under this condition, the bias circuit for either tube VT4 or VT5 is disconnected from ground through tube VT7 and is connected instead through resistance 126 to the cathodes of tubes, VT4 and VT5. The motor is now no longer in the grid-cathode circuit of either tube VT4 or VT5 so that the transient inductive potentials which occur across the motor will not fire tubes VT4 and VT5. After these inductive surges from the motor have become dissipated, the counter-electromotive force, if any, will again make the tube VT7 conducting so reconnecting the rotor into the grid-cathode of either tube VT4 or VT5 to again provide speed control under the supervision of the incoming signal.

As the brush of potentiometer P2 moves toward its lower winding terminal under the control of motor M as just described, potential of phase φ2 applied over the circuit previously traced through rheostat R3 will increase in value until it balances the potential of phase φ1 applied from potentiometer P1. As the unbalance decreases the potential impressed upon the grids of tubes VT4 and VT5 decreases resulting in a decrease in the speed of motor M until it finally stops when the brush of potentiometer P2 reaches a point where the potentials of opposite phase transmitted through the rheostat R3 are in balance and no signal potential is impressed upon the grids of tubes VT4 and VT5. Shaft 111 has thus been rotated in a direction to operate any apparatus connected therewith to an amount commensurate with the setting of the potentiometer P1.

It will now be assumed that a condition arises whereby the brush of potentiometer P1 is now moved toward the right terminal of its winding whereby the potential of phase φ1 applied over the left portion of its winding through rheostat R3 is reduced in value so that now the potential of phase φ2 applied through rheostat R3 and over the lower portion of the winding of the balancing potentiometer P2 now predominates and this predominating potential of phase φ2 will now be applied to the control grid of tube VT1. Tube VT1 now amplifies this potential and impresses it through the windings of transformer T1 upon the control grids of tubes VT4 and VT5 as a positive signaling potential.

In the manner previously described the tubes VT4 and VT5 will alternately fire in response to the signaling potential and tube VT6 will also fire since the signaling potential applied to its control grid is in phase with the anode potential applied to its anode over the circuit from ground through the lower portion of the secondary winding of transformer T3, through the ballast lamp resistance BL, through resistance 130 and the winding of anode relay 113 in parallel, through choke coil 131 and to the anode of tube VT6. Consequently anode relay 113 is operated in turn operating reversing relay 109 which latter relay reverses the rotor circuit of the motor M with respect to the cathode-anode paths through the tubes VT4 and VT5. With the stator circuit of motor M energized from the battery B1 and the rotor circuit of the motor energized by impulses of positive current transmitted alternately therethrough over the cathode-anode paths through the tubes VT4 and VT5 the motor will now be driven in such a direction of rotation as to rotate the shaft 111 and move the brush 112 of potentiometer P2 toward the upper terminal of its winding.

As the brush of potentiometer P2 thus moves the potential of phase $\phi 2$ transmitted thereover through the rheostat R3 is decreased thereby reducing the unbalance of the control circuit and the value of the signaling potential applied to the grids of tubes VT4, VT5 and VT6. The motor M thereupon slows down and when the brush of potentiometer P2 is so positioned that the potential of phase $\phi 2$ applied thereover equals the potential of phase $\phi 1$ applied over the brush of potentiometer P1 no signaling potential will appear on the grids of tubes VT4 and VT5 and the motor will therefore come to rest.

In the event that the rotation of the motor M is not arrested through the balancing action of the potentiometer P2, either limit switch L1 or L2, dependent upon the direction of rotation of the shaft 111, will be operated to open the rotor circuit of the motor before the brush 112 will have been rotated off an end of the winding of potentiometer P2 thus guarding the potentiometer and any other apparatus controlled by the shaft 111 against injury.

What is claimed is:

1. In an electrical network unbalanced by a change in the magnitude of a condition under measurement, a motor having a rotor circuit and a stator circuit, a first and a second electronic device alternately responsive to alternate half cycles of alternating current upon the unbalance of said network in either a positive or a negative sense to establish the rotor circuit of said motor, a diode tube and a resistance bridged in series across the rotor winding of said motor for preventing the false operation of either of said devices due to the inductive surges from the motor following the cessation of driving impulses transmitted through said rotor circuit, and means controlled by said motor for restoring the balance to said network.

2. In an electrical network unbalanced by a change in the magnitude of a condition under measurement, a motor having a rotor circuit and a stator circuit, a first and a second electronic device alternately responsive to alternate half cycles of alternating current upon the unbalance of said network in either a positive or a negative sense to establish the rotor circuit of said motor, a diode tube and a resistance bridged in series across the rotor winding of said motor and so poled as to be conducting in response to the counter-electromotive force of said motor but nonconducting to inductive surges generated by said motor whereby the inductive surges from the motor following the cessation of driving impulses transmitted through said rotor circuit are ineffective to cause the false operation of either of said devices, and means controlled by said motor for restoring the balance to said network.

3. In an electrical network, a first source of alternating current, means for applying potential from said source to said network to cause an unbalance thereof in accordance with a change in the magnitude of a condition under measurement, a direct current motor having a rotor circuit and a stator circuit, a source of direct current for energizing said stator circuit, second sources of alternating current of opposite phase, a first electronic device having its anode potential supplied from one of said latter sources in series with said rotor circuit, a second electronic device having its anode potential supplied from the other of said latter sources in series with said rotor circuit, said devices being alternately responsive to alternate half cycles of said first source of alternating current to cause the transmission of impulses through said rotor circuit whereby said motor is operated, a diode tube and a resistance bridged in series across the rotor winding of said motor for preventing the false operation of either of said devices due to the inductive surges from said motor following the cessation of driving impulses transmitted through its rotor circuit, and means controlled by said motor to restore the balance to said network to thereby arrest the rotation of said motor.

4. In an electrical network unbalanced by a change in the magnitude of a condition under measurement, a direct current motor having a rotor circuit and a stator circuit, a source of direct current for energizing said stator circuit, a source of alternating current, a first and a second electronic device alternately responsive to alternating half waves of said source of alternating current upon the unbalance of said network in either a positive or a negative sense to connect said source of alternating current to the rotor cricuit of said motor, a third electronic device responsive to the unbalance of said network in one of said senses, a relay operable by said latter device to reverse the direction of current flow through the rotor circuit of said motor, a diode tube and a resistance bridged in series across the rotor winding of said motor for preventing the false operation of either said first or second device due to the inductive surges from the motor following the cessation of driving impulses transmitted through said rotor circuit, and means controlled by said motor for restoring the balance to said network to thereby arrest the rotation of said motor.

ROBERT H. GUMLEY.